(12) United States Patent
Kehoe

(10) Patent No.: US 11,316,472 B2
(45) Date of Patent: *Apr. 26, 2022

(54) SYSTEM FOR USE WITH CONTAMINATED LAND AND AS PART OF A FACILITY

(71) Applicant: Patrick Kehoe, Orillia (CA)

(72) Inventor: Patrick Kehoe, Orillia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,527

(22) Filed: Jul. 13, 2020

(65) Prior Publication Data

US 2020/0350859 A1    Nov. 5, 2020

Related U.S. Application Data

(63) Continuation of application No. 16/593,254, filed on Oct. 4, 2019, now Pat. No. 10,727,785, which is a
(Continued)

(51) Int. Cl.

| | |
|---|---|
| *B09C 1/00* | (2006.01) |
| *H02S 40/44* | (2014.01) |
| *B60L 53/51* | (2019.01) |
| *B60L 53/57* | (2019.01) |
| *C02F 1/72* | (2006.01) |
| *C02F 3/34* | (2006.01) |
| *C02F 1/46* | (2006.01) |

(Continued)

(52) U.S. Cl.
CPC ............... *H02S 40/44* (2014.12); *B09C 1/00* (2013.01); *B60L 53/51* (2019.02); *B60L 53/57* (2019.02); *C01B 3/00* (2013.01); *C02F 1/46* (2013.01); *C02F 1/72* (2013.01); *C02F 3/348* (2013.01); *H02S 20/10* (2014.12); *H02S 30/10* (2014.12); *H02S 40/38* (2014.12); *C02F 2103/06* (2013.01); *C02F 2201/009* (2013.01); *C02F 2209/008* (2013.01)

(58) Field of Classification Search
CPC ........... B09C 1/00; B09C 1/002; B09C 1/005; B09C 1/02; B09C 1/06; B09C 1/062
USPC ............................................ 405/128.1–128.9
See application file for complete search history.

(56) References Cited

U.S. PATENT DOCUMENTS 10,727,785 B2 *   7/2020   Kehoe ...................... C02F 1/46

FOREIGN PATENT DOCUMENTS

| CN | 108555014 A | * | 9/2018 |
| WO | WO 2014004691 A | * | 1/2014 |

OTHER PUBLICATIONS

Machine translation of CN 108555014, pp. 7, Sep. 2018 (Year: 2018).*

* cited by examiner

*Primary Examiner* — Sunil Singh
(74) *Attorney, Agent, or Firm* — Crowe & Dunlevy, P.C.

(57) ABSTRACT

A system for use with contaminated land comprises: a region defined by or within the land, the region having a plurality of locations defined therewithin; at each location, one or more apparatus selected from the group comprising: sensor, well, electrode, cathode, injector and vent; an array of photovoltaic cells for producing DC power; a ground-mounted frame supporting the array, the frame having a boundary substantially contiguous with the region and supporting the photovoltaic cells; a fluid distribution system of conduits supported by the frame; a power system for delivering DC power to each of the locations; and a communication system adapted to provide for remote control of the apparatus.

6 Claims, 2 Drawing Sheets

Related U.S. Application Data continuation-in-part of application No. 16/182,165, filed on Nov. 6, 2018, now abandoned.

(60) Provisional application No. 62/581,871, filed on Nov. 6, 2017, provisional application No. 62/843,622, filed on May 6, 2019, provisional application No. 62/843,731, filed on May 6, 2019.

(51) Int. Cl.
*H02S 30/10* (2014.01)
*H02S 40/38* (2014.01)
*C01B 3/00* (2006.01)
*H02S 20/10* (2014.01)
*C02F 103/06* (2006.01)

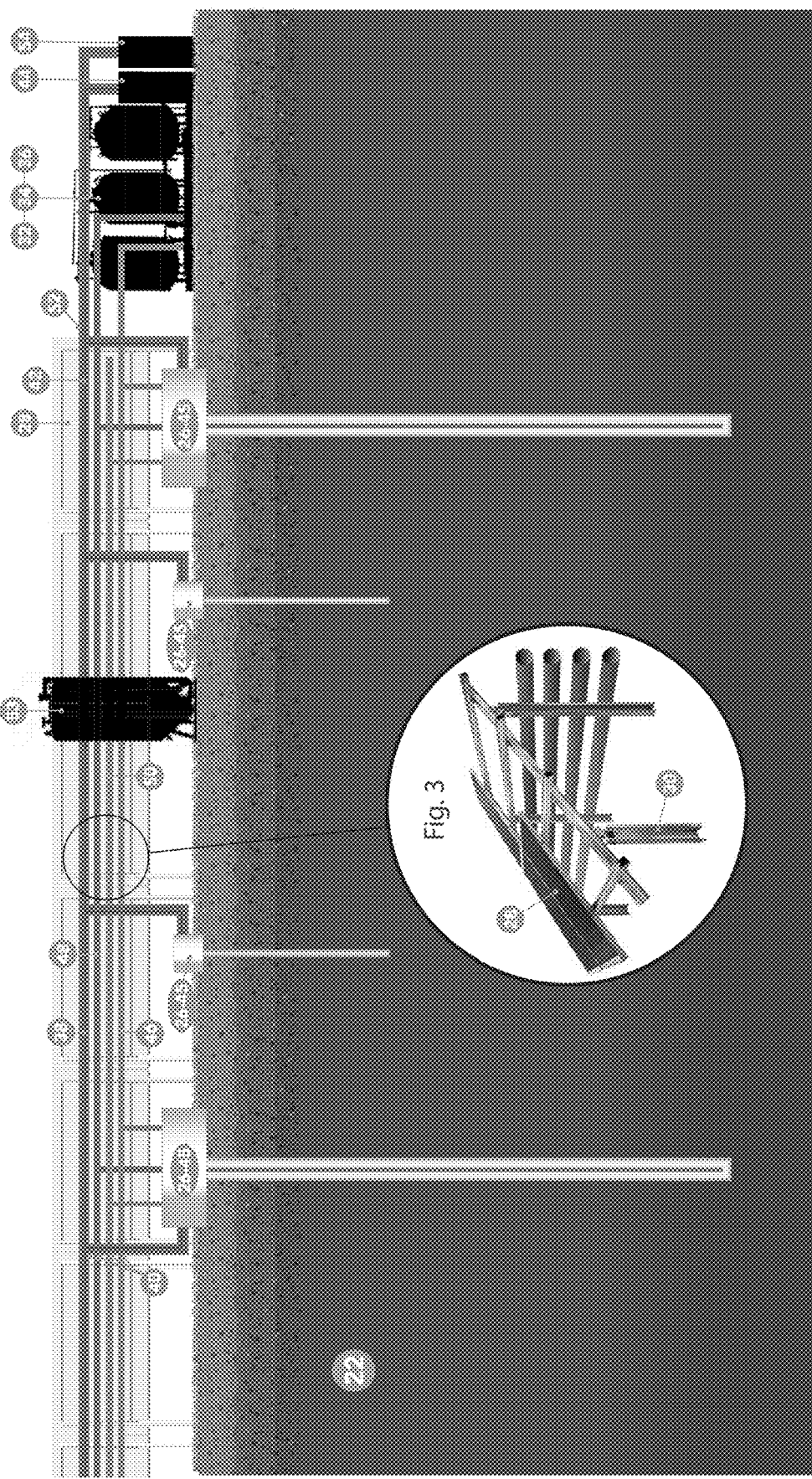

SYSTEM FOR USE WITH CONTAMINATED LAND AND AS PART OF A FACILITY

CROSS-REFERENCE TO RELATED APPLICATIONS

This application is a continuation application of U.S. patent application Ser. No. 16/593,254 filed Oct. 4, 2019, which is a continuation-in-part of U.S. patent application Ser. No. 16/182,165 filed Nov. 6, 2018, which claims the benefit of U.S. Provisional Patent Application No. 62/581,871 filed Nov. 6, 2017, and this application also claims the benefit of U.S. Provisional Patent Application No. 62/843,622 filed May 6, 2019 and U.S. Provisional Patent Application No. 62/843,731 filed May 6, 2019, and incorporates each of said applications by reference into this document as if fully set out at this point.

FIELD

The invention relates to the fields of soil and groundwater remediation and electric vehicle charging.

BACKGROUND

The demand for DC-powered vehicles in commerce is growing rapidly. Charging large numbers of vehicles in a relatively short period of time using present-day technology is an industrial activity which requires a large supply of DC power, the ability to dissipate heat, parking space and transportation access, all at relatively low cost and preferably near an urban area. This is not a trivial issue.

SUMMARY OF THE INVENTION

Forming one aspect of the invention is a system for use with contaminated land. The system comprises: a region defined by or within the land, the region having a plurality of locations defined therewithin; at each location, one or more apparatus selected from the group comprising: sensor, well, probe, electrode, cathode, injector and vent; an array of photovoltaic cells for producing DC power; a ground-mounted frame supporting the array, the frame having a boundary substantially contiguous with the region and supporting the photovoltaic cells; a fluid distribution system of conduits supported by the frame; a power system for delivering DC power to each of the locations; and a communication system adapted to provide for remote control of the apparatus.

According to another aspect, the system can further comprise a storage system for receiving DC power from the array, storing DC power that has been received and transferring DC power from storage to the locations.

According to another aspect, the system can further comprise a treatment facility and the fluid distribution system can be adapted to deliver gas and vapor from each location to the facility.

According to another aspect, the fluid distribution system can be adapted to deliver liquid additives to each location.

According to another aspect, the fluid distribution system can be adapted for the movement of water to and from each location.

According to another aspect, the system can further comprise a plurality of valves operatively connected to the communication system for remote control and disposed within the fluid distribution system to permit the fluid distribution system to selectively connect to the locations.

According to another aspect of the invention, the system can be used as part of a facility wherein vehicular energy stores are replenished.

According to another aspect of the invention, the vehicles can be electric vehicles and can be charged with DC power produced at least in part by the array.

According to another aspect of the invention, the vehicles can be hydrogen vehicles and can be fueled with hydrogen produced at least in part by DC power produced by the array.

Advantages, features and characteristics of the invention will become evident upon a review of the following detailed description, with reference to the appended drawings, the latter being briefly described hereinafter.

BRIEF DESCRIPTION OF THE DRAWINGS

FIG. 2 is a sectional view of a portion of the structure of FIG. 1; and

FIG. 3 is a detail view of FIG. 2.

DETAILED DESCRIPTION

System

Figure 1:
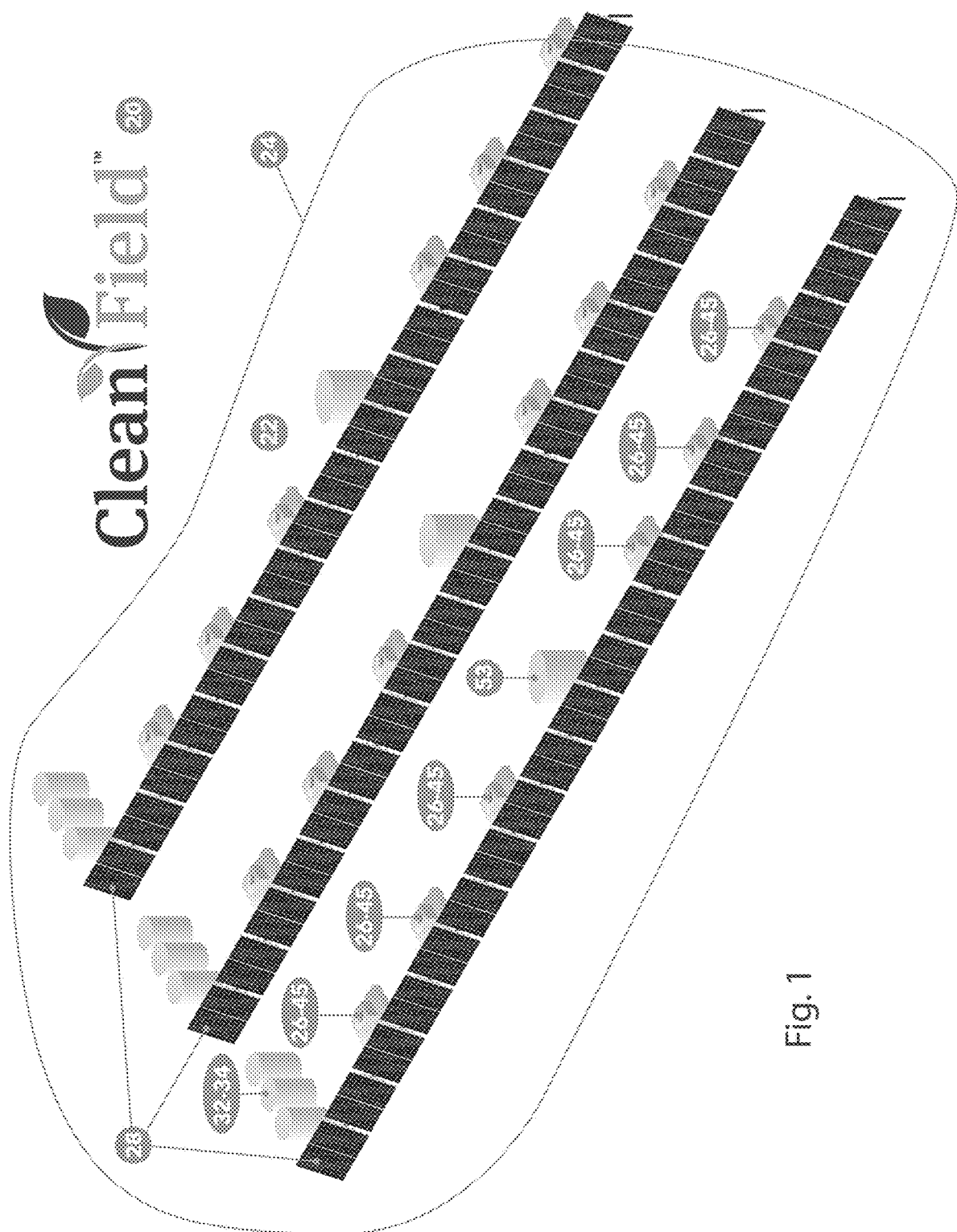
FIG. 1 is a perspective view showing an example of a system in use.

A system 20 for use with contaminated land 22 is hereinafter described and will be understood to comprise a region 24, apparatus 26, an array 28, a frame 30, a treatment facility 32, a source of additives 34, a fluid distribution system 36, a power system 38, a plurality of valves 40, a communication system 42, a storage system 44 and a vapor treatment facility 53.

The region 24 is defined by or within the land and has a plurality of locations 45 defined therein.

The apparatus 26 is provided such that, at each location 45, one or more apparatus is provided, the apparatus being selected from the group comprising sensor, well, electrode, anode, cathode, probe, injector and vent.

The array 28 is a PV array for producing DC power.

The frame 30 is mounted to the ground in a foundationless manner, i.e with ballast, and is adapted to support the PV array.

The treatment facility 32 is adapted to treat groundwater.

The additives 34 are of the type useful in the treatment of the contamination, i.e. oxidants, bacterial agents or enzymes, surfactants, oxygen, supplements to feed bacteria, additives to stabilize the pH or the oxygen level of groundwater, etc.

The fluid distribution system 36 is adapted by the inclusion of additive lines 46 to deliver liquid additives from the source 34 to each location 45, is adapted by the inclusion of water lines 48 for the movement of water to and from each location 45 and to treatment facility 32 and is adapted by the inclusion of gas lines 50 for the movement of gas or vapor from each location 45 to the treatment facility 53.

The power system is adapted to deliver DC power to each of the locations and includes a plurality of power conduits 38.

The valves 40 are disposed within the fluid distribution system 36.

The communication system 42 is operatively connected to the apparatus and the valves in this embodiment is defined by a plurality of network cables 52 that extend from each location to a common control point 54 that is linked by cellular to the internet. The system also connects the control point 54 to the probes and sensors.

The storage system 44 is adapted for receiving DC power from the array, storing DC power that has been received and transferring DC power from storage to the locations (via the power conduits 38)

Use

In use, information will be received from the probes and used to formulate instructions that are then sent, by appropriate remote manipulation of the valves, to apparatus disposed at the locations:

- the fluid distribution system can be used to: permit the controlled introduction of additives, oxidants, biologicals, supplements etc.; move groundwater from and to the various wells, optionally through a treatment facility; and to capture gaseous emissions
- pumps can pressurize some wells while drawing vapor from others
- the vapor lines, coupled with the DC supplies, can be used for electrokinetic-based remediation, with the collection of hydrogen and oxygen; oxygen can be used for remediation processes and hydrogen can be sold or used for short term energy storage
- air can be injected into the groundwater soil or aquifer
- the DC power supply can be used to positively or negatively charge oxidants or surfactants, or other liquids for purposes of mobilization (or treatment)
- the DC power can be used to mobilize heavy metals (or other contaminant) from soil and into an adsorbent or nanomaterial that it clings or bonds to, which then can be removed
- the DC power can be used to mobilize nanomaterials, oxidants, surfactants, supplements or biologicals using electrokinetics It will be appreciated that, although all apparatus could be disposed at each location, normally, apparatus will be deployed throughout the region in a manner predicted to have utility based upon the contaminant map; the sensor probes will be used to characterize the contamination with hydrogeological site information and the remedial progress and the choice and placement of apparatus around the region may from time to time be changed. The choice, placement and use of such apparatus is a matter of routine to persons of ordinary skill in the art and as such further detail is neither described nor required but it is worth noting that, by virtue of the fluid distribution system, power system and communication system, such redeployments are also relatively economical.

The system can be used as part of facility wherein vehicular energy stores are replenished, i.e. wherein the vehicles are electric vehicles and are charged with DC power produced at least in part by the array or wherein the vehicles are hydrogen vehicles and are fueled with hydrogen produced at least in part by DC power produced by the array. Of course, power from the PV can also be moved to the grid and grid power can also be used for charging, storage, remediation, etc.

Whereas distinct conduits are deployed for gas, water and additives, and valves are provided in each network, it will be appreciated that a lesser number of multi-functional conduits could be provided, since in many sites, not all remediation activities will need to be undertaken, let alone simultaneously.

Persons of ordinary skill will appreciate that such use of the system is highly advantageous:

- Most Brownfield properties are located within or near urban centers minimizing transportation distances to and from the charging facility
- Brownfield properties, due to their past industrial use, are located on arterial high capacity roads, many near the interstate.
- Roads and bridges and intersections to serve these sites in the past were constructed for large or heavy vehicle traffic. This makes them useful for large volumes of large vehicles
- Brownfield sites also have the open space necessary to accommodate large vehicle traffic
- Many Brownfield sites are already leveled, with little to no vegetation and most are fully fenced
- many Brownfield properties, again due to their past industrial use, have large capacity three phase power connections to the grid in place, allowing for a community to leverage this DC microgrid and vice versa
- Utilizing onsite DC storage avoids inversion, transmission or rectification—related losses
- Pumps, filters, vapor emission controls, etc., can be used with multiple treatment locations for cost reduction; and
- Heat, produced in the charging facility, can be transferred to ground water which, in turn, is transferred to the land through the conduits and injectors, and into wells or injection points to promote bioremediation.

Whereas the description references "land" generally, it will be appreciated that the inventive system and charging infrastructure need not occupy the same physical space; the PV array can, for example, occupy a portion of a parcel and the storage and charging facility can occupy the balance. Alternatively, a separate parcel located nearby may also be used for this purpose.

Further, portions of the Brownfield may be cleaned and severed as required. The remedial/solar infrastructure can then be removed, and that area can be redeveloped. As well, it will be appreciated that while apparatus will only be deployed in areas of contamination, i.e. the region will be relatively contiguous with the contamination, the PV array may well extend well therebeyond.

Moreover, whereas the detailed description mentions DC vehicle fleets, other heavy users of DC power with or without heat dissipation requirements, such as data centers, robotics, vertical farming could also benefit from the system.

As well, whereas the disclosure mentions that DC power generated by the array is used to drive the remediation and is also used to supply an onsite user, it will be appreciated that the facility need not be electrically isolated from the grid, and indeed, ideally will not, at least to permit the microgrid of the facility to be used to supplement the grid in emergency situations or whenever there is excess energy produced. As such, power can flow from the facility to the grid and vice-versa, as necessary and as beneficial, through inverters where required.

Further, whereas the embodiment describes a facility that treats vapor produced by sparging, it will be appreciated that the facility can be modified to treat the emissions produced by remediation at the site, ie. air, gas or vapor produced by sparging, bioventing, soil vapor extraction, etc., and indeed could be omitted altogether in some applications.

Similarly, whereas a supplement source is mentioned in the described embodiment, it also may be omitted in some circumstances.

Further, whereas only a limited number of remediation techniques are mentioned, it will be appreciated that the invention permits a fully functional, passive, programmable network operating environment that provides all required operational requirements for at least the following proven technologies:

MECHANICAL—Pump & Treat; Soil Vapor Extraction; Sparging; Air Stripping; Electrokinetic Remediation; Electrokinetic Extraction; Electro-reclamation; Thermal Desorption; Electrical Resistance Heating; In-situ Flushing; Vadose Zone Flooding; and Ozone production and contaminant Oxidization.

CHEMICAL—Nanoremediation; ISCO-Chemical Oxidation; Surfactant Injection; Surfactant Enhanced Aquifer Remediation; and Precipitation.

BIOLOGICAL—Bioremediation; Bioaugmentation; Biostimulation; Bioventing; Biofiltration; Bioslurping; Bioreactors; Microbial Biodegradation; and Phytoremediation.

OTHER (HYBRIDS)—Electrokinetic Nanoremediation; Electrokinetic Enhanced Phytoremediation; Electrochemical Remediation; Electrokinetic Enhanced Bioremediation; Electrokinetic Chemical Oxidization; Bio-Electrokinetic Remediation; Bioventing; Electrokinetic Enhanced Surfactant Mobilization; and Vadose Zone Surfactant Flooding.

Whereas a cellular link is described, it will be appreciated that connectivity could be provided by cable or the like.

Accordingly, the invention should be understood to be limited only by the accompanying claims, purposively construed.

The invention claimed is:

1. A system for use with contaminated land, the system comprising:
    a region defined by or within the contaminated land, the region having a plurality of locations defined therewithin;
    at each of the plurality of locations, one or more apparatus selected from the group comprising: sensor, well, electrode, cathode, injector and vent;
    an array of photovoltaic cells for producing DC power;
    a fluid distribution system of conduits;
    a power system for delivering DC power to each of the plurality of locations;
    a communication system adapted to provide for remote control of the one or more apparatus; and
    a plurality of valves operatively connected to the communication system for remote control and disposed within the fluid distribution system to permit the fluid distribution system to selectively connect one or more of the plurality of locations.

2. A system according to claim 1, further comprising a storage system for receiving DC power from the array, storing DC power that has been received and transferring DC power from storage to the locations.

3. A system according to claim 1, further comprising a treatment facility and the fluid distribution system is adapted to deliver gas or vapor from each location to the treatment facility for treatment.

4. A system according to claim 1, wherein the fluid distribution system is adapted to deliver liquid additives to each location.

5. A system according to claim 1, wherein the fluid distribution system is adapted for the movement of water to and from each location.

6. The system according to claim 1 further comprises a ground-mounted frame supporting the array, the frame having a boundary substantially contiguous with the region and supporting the photovoltaic cells.

* * * * *